Patented May 19, 1925.

1,538,111

UNITED STATES PATENT OFFICE.

MINER L. HARTMANN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ABRASIVE ARTICLE.

No Drawing.   Application filed September 29, 1923.   Serial No. 665,724.

*To all whom it may concern:*

Be it known that I, MINER L. HARTMANN, a citizen of the United States, residing at Niagara Falls, in the county of Niagara and State of New York, have invented a new and useful Improvement in Abrasive Articles, of which the following is a full, clear, and exact description.

This invention refers to the use of alumina cement in the manufacture of abrasive articles. Alumina cement is the name now applied to a cement of recent commercial development consisting substantially of mono-calcic-aluminate, $Al_2O_3CaO$, containing certain quantities of silica and oxide of iron and is made by the grinding of a product produced either by calcination or by fusion in a fuel-fired reverbatory furnace or in an electric furnace of mixtures of alumina ores and lime. It is differentiated from Portland cement by its chemical composition and the fact that when used in mortars and in mixtures with aggregates, it develops a strength far exceeding that of Portland cement both in a setting period of 48 hours and in a period of 28 days and longer. The material made with alumina cement furthermore is more resistant to chemical action, especially the action of sulphates and sea water.

Abrasive articles are generally composed of molded mixtures of abrasive grains united by a binder. The binders most commonly used are ceramic or vitrified binders, silicate of soda binders, plastic binders such as shellac, rubber or phenol condensation products, and magnesia cement. Abrasive articles using ceramic binders, plastic binders or silicate of soda binders require heat in the burning or setting of the product, and this burning or baking process is an important item in cost of manufacture, both because of its expense and a certain percentage of loss of product due to imperfect firing. Magnesia binders are cold setting but articles made therefrom are not insoluble in water and can not be used in grinding operations where water is present.

There is a distinct demand in the abrasive field for a strong waterproof binder that is cold setting and Portland cement has never been able to fill this field on account of its low tensile strength. I have discovered that alumina cement can be used to great advantage for this purpose on account of its higher tensile strength and quick setting, and it is especially valuable in the manufacture of large grinding wheels, such, for example, as are used in grinding wood pulp.

In carrying out the invention, as a typical example, abrasive grains are mixed with alumina cement in the proportion of 66% of grain to 34% of cement, mixed with water in the usual manner, and brought to the consistency of mortar. This is then put in molds of the dimensions of the grinding wheel desired and allowed to set for 48 hours. It is then removed from the mold, trued up in a lathe and bushed in the usual manner. Instead of using a mixture of mortar consistency, the mixture may be moistened with water just sufficient to bring it to the consistency of molding sand and then pressed in molds by hand tamping or by hydraulic pressure and then allowed to set. The proportions of cement and abrasive grain may be varied within considerable limits. I may use as low as 25% cement for the softer grades of grinding wheels and upwards of 50% cement for the harder grades and for sharpening stones and the like.

This form of alumina binder may be used not only for the manufacture of grinding wheels and grinding disks, but also for the production of sharpening stones and blocks and anti-slipping floor tile and floor treads of various descriptions.

I claim:

1. An abrasive article consisting of abrasive grains united by alumina cement composed substantially of mono-calcic aluminate.

2. An abrasive article consisting of a mixture of between 75% and 50% abrasive grains and between 25% and 50% alumina cement.

3. An abrasive article comprising abrasive grains and alumina cement in the proportions of approximately two parts abrasive grains to one part cement.

In testimony whereof I have hereunto set my hand.

MINER L. HARTMANN.